May 6, 1930. E. A. CONNER 1,756,972
WIRE STRAND
Filed March 12, 1926
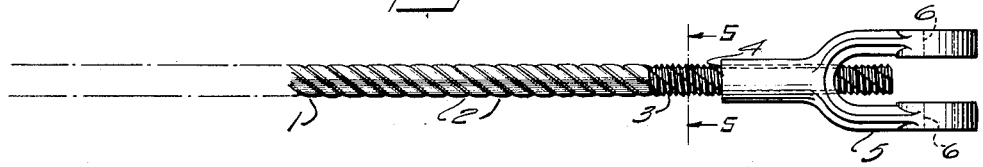
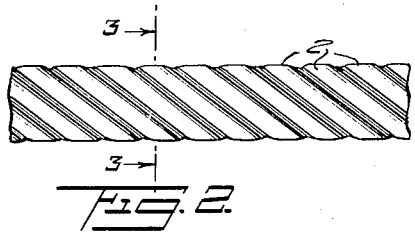
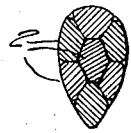
Edward A. Conner, INVENTOR
BY
Frederick S. Duncan, ATTORNEY Patented May 6, 1930

1,756,972

UNITED STATES PATENT OFFICE

EDWARD A. CONNER, OF STRATFORD, CONNECTICUT, ASSIGNOR TO AMERICAN CHAIN COMPANY, INC., A CORPORATION OF NEW YORK

WIRE STRAND

Application filed March 12, 1926. Serial No. 94,353.

This invention relates to wire strands, and is of particular utility when embodied in wire stays or similar tension members for use in aeroplanes, although the improvements herein disclosed may be used in any field for which they are adapted by their nature, and the expression "strand" is used in an inclusive sense to cover wire ropes and cables formed of several strands.

The primary object of the invention is to provide a strand composed of several wires twisted or laid together in helical or other suitable relation and formed by swedging or suitable working to present a cross-section of stream-line contour, thereby to diminish the air-resistance of an aeroplane stay thus constituted, while preserving the advantageous properties of flexibility and tensile strength which a stay formed of twisted wires affords in comparison with solid wires or rods used for aeroplane stays or for tension members in analogous installations.

Another object of the invention is to provide for the attachment of standard stays of stream-line contour to the associated structural elements of an aeroplane, or other structure, by means of a joint comprising an attaching member having a socket threaded internally to receive the threaded portion of the strand, these threaded portions respectively being preferably of circular cross-section to permit the shackle and strand to be screwed together.

The various features of the invention are described and claimed in the specification and illustrated in the drawings, in which Figure 1 is an edge view in elevation of an aeroplane stay member in the construction of which the invention has been embodied.

Fig. 2 is a view in side elevation of a portion thereof.

Fig. 3 is a section thereof on the line 3—3, on a larger scale.

Fig. 4 is a similar view of a modification.

Fig. 5 is a section at 5—5, Fig. 1, looking from right to left.

In the illustrated embodiment, the part designated by the reference numeral 1 is a wire strand formed of wire component members 2, twisted or laid together in helical relation, and preferably constituting what is sometimes described as an inert-lay strand, in which by preformation of the strand components helically they are rendered free from the tendency to untwist when the strand is severed.

In pursuance of the invention, the strand is worked by the application thereto of forces acting upon its periphery to impart thereto a stream-line contour of which a typical shape is shown in the drawing and is best seen by reference to Fig. 3, although the shape there shown is illustrated only by way of example, and may be modified as found suitable and desirable to meet the exigencies of particular installations, Fig. 4 showing such a modification of contour.

In accordance with a further object of the invention, provision is made at a suitable region of the strand for attachment to the associated structure of the aeroplane, or to other structures with which it is desirable to connect the strand, by working the periphery of the selected portion of the strand to form thereon a thread 3, adapted to be screwed into the threaded socket 4 of an attachment member 5, illustrated as a shackle to be connected with a part of the aeroplane, (not shown) by means of a pin or bolt to be inserted in the eyes 6 provided in the end of the shackle.

In Figs. 1 and 5, the part 3 is shown as of the original cylindrical form in which the strand components may be laid and closed preparatory to the working and threading operations above described.

Having described my invention, I claim:

1. A structural element of the class described comprising a strand formed of a plurality of wires laid together and having a periphery of streamline contour.

2. A strand formed of wires laid together and having a periphery of streamline contour, said strand having an attachment portion formed with a thread to adapt said strand to be united with a correspondingly threaded attachment member, the threaded portion of the strand being cylindrical in contour.

3. The combination, with a wire strand formed of wires laid together and having a portion of its periphery of streamline contour, and a portion of cylindrical contour provided with a thread, of an attachment member having a threaded socket screwed upon said threaded portion of said strand.

In testimony whereof, I have signed this specification.

EDWARD A. CONNER.